United States Patent
Kawash et al.

(10) Patent No.: US 9,786,088 B2
(45) Date of Patent: Oct. 10, 2017

(54) ANIMATED POSTER

(71) Applicant: Universal City Studios LLC, Universal City, CA (US)

(72) Inventors: Sameer Kawash, Orlando, FL (US); Derek Hibbs, Pasadena, CA (US); Joel Fretts, Orlando, CA (US); Michael Ogden, Orlando, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 684 days.

(21) Appl. No.: 14/295,125

(22) Filed: Jun. 3, 2014

(65) Prior Publication Data
US 2015/0348304 A1    Dec. 3, 2015

(51) Int. Cl.
| | |
|---|---|
| *G06T 13/80* | (2011.01) |
| *G06T 11/00* | (2006.01) |
| *G03B 21/62* | (2014.01) |
| *G09F 13/04* | (2006.01) |
| *G09F 13/08* | (2006.01) |
| *G09F 19/18* | (2006.01) |
| *G09F 19/22* | (2006.01) |

(52) U.S. Cl.
CPC ............. *G06T 13/80* (2013.01); *G03B 21/62* (2013.01); *G06T 11/001* (2013.01); *G09F 13/0409* (2013.01); *G09F 13/08* (2013.01); *G09F 19/18* (2013.01); *G09F 19/22* (2013.01); *G09F 2013/0445* (2013.01)

(58) Field of Classification Search
CPC ....... H04N 5/262; G06T 11/001; G06T 13/20; G09F 19/18; G09F 19/22; G09F 13/0409; G09F 13/08; G09F 2007/186; G09F 2019/221; G09F 7/18; G09F 13/00; G03B 21/62

See application file for complete search history.

(56) References Cited

U.S. PATENT DOCUMENTS

| | | | |
|---|---|---|---|
| 4,989,953 | A | 2/1991 | Kirschner |
| 5,257,130 | A | 10/1993 | Monroe |

(Continued)

FOREIGN PATENT DOCUMENTS

| | | |
|---|---|---|
| GB | 2397188 | 7/2004 |
| JP | 2000280267 | 10/2000 |

(Continued)

OTHER PUBLICATIONS

PCT International Search Report and Written Opinion dated Sep. 23, 2015.

(Continued)

*Primary Examiner* — Michael Teitelbaum
(74) *Attorney, Agent, or Firm* — Fletcher Yoder P.C.

(57) ABSTRACT

An animated poster system including a simulation panel, an image server having appropriately processed media, and a projector enable a moving image to appear on a textured surface of the panel with no detectable projection devices. The simulation panel includes a portion that, when illuminated by the projector with the media, appears to be paper that is wrinkled, torn, and/or pasted to the wall, and includes graphics that also appear to be printed but include moving images. The animated poster system can produce a convincing illusion of an animated poster, even at close observing distances.

23 Claims, 3 Drawing Sheets

(56) References Cited

U.S. PATENT DOCUMENTS

| | | | |
|---|---|---|---|
| 5,805,358 A * | 9/1998 | Yamashita | G02B 1/041 |
| | | | 359/742 |
| 6,266,069 B1 | 7/2001 | Thagard et al. | |
| 2003/0035917 A1 | 2/2003 | Hyman | |
| 2003/0046838 A1 | 3/2003 | O'Connell, Jr. | |
| 2003/0222888 A1 | 12/2003 | Epshteyn | |
| 2006/0138944 A1 | 6/2006 | Ray et al. | |
| 2007/0024603 A1 | 2/2007 | Li | |
| 2009/0115835 A1 * | 5/2009 | Shaffer | H04N 7/15 |
| | | | 348/14.08 |
| 2009/0154762 A1 | 6/2009 | Choi et al. | |
| 2010/0066978 A1 | 3/2010 | Powell et al. | |
| 2011/0273485 A1 | 11/2011 | Coup et al. | |

FOREIGN PATENT DOCUMENTS

| | | |
|---|---|---|
| JP | 2005055599 | 3/2005 |
| KR | 100807693 | 9/2007 |

OTHER PUBLICATIONS

Lorrie Freedman; "How to Give a Photograph a Painterly Look Using Photoshop", pp. 1-14; http://blog.lorrifreedman.com/index.php/2008/12/01/how-to-give-a-photograph-a-painterly-look-using-photoshop/.

Media Chance; "Dynamic Auto-Painter", pp. 1-8; http://www.mediachance.com/dap/index.html.

* cited by examiner

ANIMATED POSTER

BACKGROUND

The present disclosure relates generally to a system and method for displaying images on a wall using an animated poster.

Electronic displays such as plasma display panels, liquid crystal displays, light emitting diode displays, organic light emitting diode displays, and so forth, are constantly subjected to further resolution enhancement. In some displays (e.g., televisions), a person can walk up to the television and not be able to discern individual pixels on the television screen. It is therefore not surprising that these display technologies are used in a wide variety of contexts, such as anywhere from watching television or movies, to displaying still representations of photographs, paintings, and so on.

Usually, these display devices are associated with a sleek, stylized look. Many popular computer displays, tablets, smartphones, and television devices, for example, have clean, glossy borders and a relatively smooth surface. Such a look can be used to great effect in marketing certain lines of display products, as this look can be associated with a high quality build of the product. In other settings, electronic display devices may be associated with ornamental features, for example a stylized surrounding associated with a digital picture frame. Further still, functional elements such as keyboards, track pads, etc., may be associated for interacting with the electronic displays.

In certain implementations, such as in amusement parks, large display surfaces may be used to great effect in providing an immersive experience for guests. For example, projection surfaces or other displays can be used to simulate windows out into simulated environments, such as in a stationary ride that utilizes a display at its forward end to simulate travel through an environment displayed on the projection surface. The simulated environment may include tortuous paths, along which travel may be simulated using a moving platform on which the guests are positioned.

However, even with such high resolutions for certain displays and additional physical simulations, a person viewing a particular display will usually recognize that they are, in fact, looking at image elements on a display and not real elements. As an example, a person looking at a digital picture frame can usually ascertain that the picture is digital, and not a printed photograph on photograph paper. Indeed, enhancing the realism of a display represents a constant challenge in many settings, whether it be by way of increasing screen resolution, improving color reproduction, enhancing visual effects using the external environment surrounding the display, and so forth.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one aspect of the present disclosure, an animated poster system includes a simulation panel comprising a poster portion, wherein the poster portion comprises a cast resin in which a sheet configured to act as an illumination surface is positioned; a projector configured to project an image onto a first side of the simulation panel so as to illuminate the sheet such that the image is reproduced on the sheet; and an image server in communication with the projector and comprising a non-transitory, machine-readable medium storing data representative of the image, and the data is such that the image reproduced on the sheet contains animated image elements, thereby creating an appearance of an animated poster on the poster portion.

In accordance with another aspect of the present disclosure, a method includes forming a simulation panel by a process comprising: creating a mold of at least a poster on a textured wall using a mold material such that the mold comprises a texture and geometry of the poster; filling the mold with a casting material; curing the casting material to form a cast resin, wherein the cast resin comprises the texture and geometry of the poster; and placing a translucent sheet in a position corresponding to the geometry of the poster, wherein the translucent sheet is placed in the position corresponding to the geometry of the poster after the curing of the casting material, or before the curing of the casting material.

In accordance with another aspect of the present disclosure, a simulation panel is provided that is formed by a process comprising: securing a poster to a wall; creating a mold of the poster and at least a portion of the wall beyond a perimeter of the poster using a mold material such that the mold comprises a texture and geometry of the poster and a texture and geometry of the portion of the wall; filling the mold with a casting material; polymerizing the casting material to form a cast resin, the cast resin having at least some of the texture and the geometry of the poster and the wall, and wherein the casting material is such that the cast resin has a first optical transmittance; and placing a translucent sheet in a position corresponding to the geometry of the poster such that the sheet is disposed within an inset of the casting resin, and wherein the translucent sheet has a second optical transmittance that is lower than the first optical transmittance.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As noted above, enhancing the realism of a display represents a constant challenge in a number of settings in which a display might be used. As a further example, in certain amusement park attractions, guests may be able to walk or ride through areas that include various show features, such as images, props, or the like. Such an area may include a school, a room, an airport, a train station, an alley, or similar surroundings. In certain situations, it may be desirable to create an illusion of certain fantastical effects from fictitious settings, such as props that are seemingly magical. Simulations to create such illusions may, in their most general sense, be displayed using many display technologies. However, as an observer moves to within a certain distance of such a simulation, the illusion quickly loses its intended effect because the simulation on the display becomes apparent. In other words, the observer recognizes that they are looking at a display that is simulating an element.

In this regard, one significant challenge with such simulations is that human eyes are generally very good at discerning real elements from elements provided on an electronic display. Using an example of an animated poster, a person could easily tell if a flat screen television or computer monitor were being used to simulate a poster with seemingly animated elements. For example, the observer would expect to see a paper-like surface, perhaps with texture, but would instead see the display surface and recognize the glossy screen. Indeed, it is presently recognized that the various textures and minor surface imperfections that enable differentiation between, for instance, a sheet of paper and an electronic display, can be used to great effect in creating the illusion of a photograph, poster, or the like, with seemingly animated elements. In accordance with present embodiments, illusions of animations on a work of art, or a poster, are enabled by generating a projection surface that mimics the textures and other surface features that one would expect to see in a real poster attached to a wall.

In accordance with the present disclosure, to produce an animated photograph, poster, or other animated print material, a sheet of paper having the desired physical features (e.g., textures, tears, wrinkles) of the simulated paper is adhered to a textured base, such as a rough textured wall. A section of the base that includes the sheet of paper as well as a portion of the base surrounding the sheet of paper may be reproduced using, for example, a casting resin.

The reproduction may be produced by first forming a mold of a panel including the paper on the textured wall. In this way, the mold includes an inset in the shape of the paper (e.g., including various creases, wrinkles, tears, and other imperfections of the paper), and also includes a surrounding portion having a texture produced from the texture of the surrounding base.

A surface for illumination, such as a translucent sheet of paper, is placed within the inset left by the first paper (the first paper is now removed), and the mold is filled with a casting resin and a reinforcing material for structural support. In other words, the casting and reinforcement materials form a composite. Once the casting material is cured, the reproduction (e.g., a cast panel of a portion of the wall) is used to replace the wall from which the mold was produced.

As an example, the portion of the wall that was molded may be cut out or otherwise removed, and replaced by the cast panel.

The panel acts as a rear projection screen. Accordingly, a portion of the panel that does not correspond to the animated print (e.g., the portion of the panel surrounding the paper inset) may be painted so as to mitigate visible illumination of the panel outside of the animated print.

A suitably configured projector is used to illuminate at least a portion of the panel—specifically the inset portion corresponding to the paper and including the translucent sheet. Because the projection surface having the translucent sheet includes many of the qualities of the actual paper, including its texture and shape, the image projected onto the surface may provide the illusion of an actual paper adhered to the base. The images projected onto the surface may include both static and moving elements, thereby producing the illusion of a poster, photograph, or other printed medium that is animated.

Producing the panel in this way enables the projection illuminated thereon to be substantially undetectable. In addition, by balancing the brightness of the image with the ambient light of the room, the poster may appear to be a flat, graphic surface. In this regard, additional techniques may be used to further refine the appearance of the poster. For example, neutral density filters may be used in combination with the translucent sheet as a part of the panel production process. The filters may be used to control the illumination of the translucent sheet, for example to match or otherwise blend with the ambient light surrounding the panel. Additionally or alternatively, the density filters may be used in combination with the projectors (e.g., over a projection lens).

Using approaches such as these, the present disclosure enables an illusion of an animated paper (e.g., poster, photograph) to be created. The animated paper is generally a seamless, unified graphic image, and simulates the various textures and look of a paper adhered to a surface, such as a brick wall. Other approaches, such as an unmodified video display or a combination of a real paper with a cutout for such a display, may not accomplish these effects.

Figure 1:
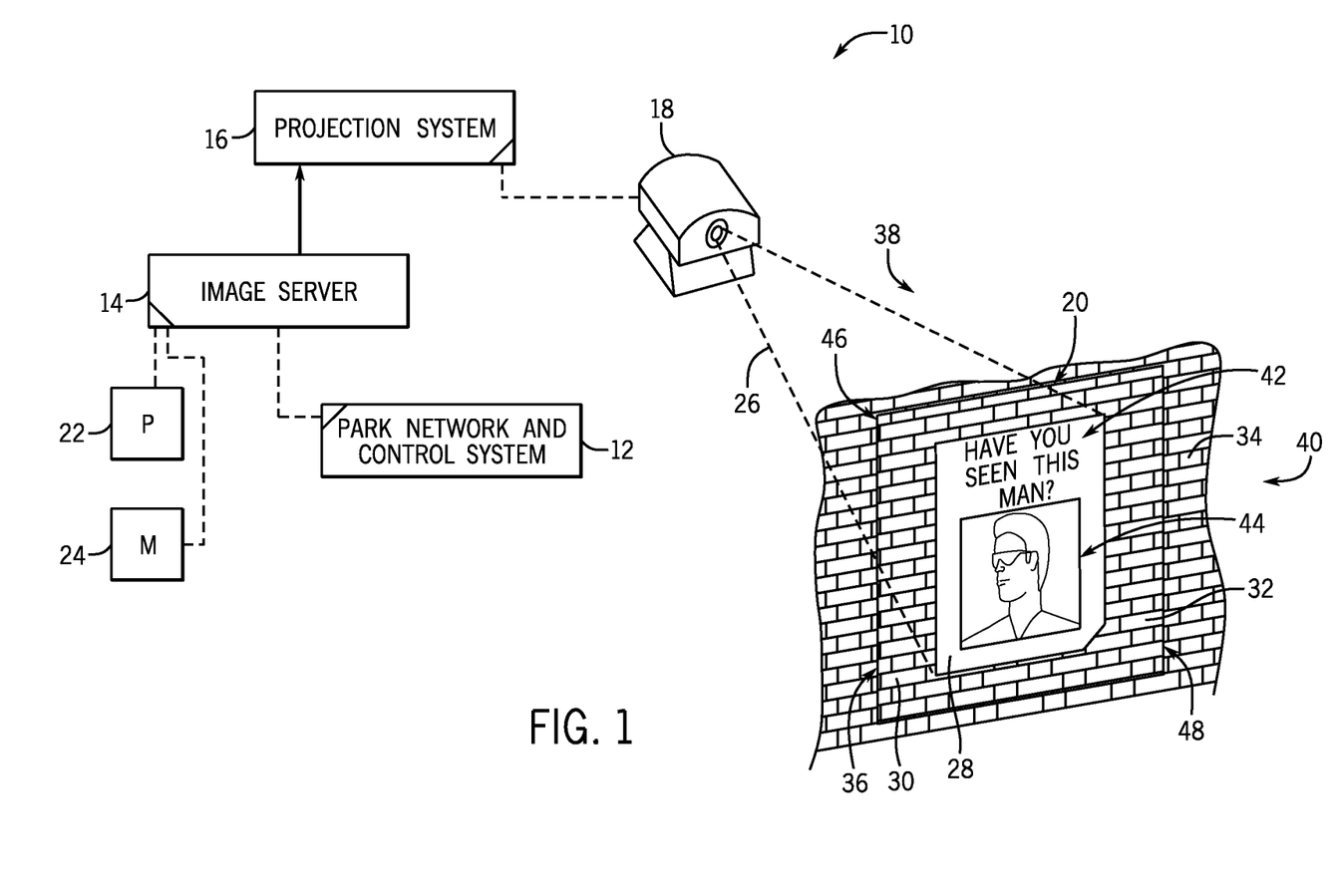
FIG. 1 illustrates a schematic perspective view of an embodiment of an animated poster system including a park network and control system, image server, and projection system that enable the projection of images onto a simulation panel supported by a wall to produce an animated poster, in accordance with an aspect of the present disclosure.

Referring now to FIG. 1, a perspective view of an embodiment of an animated poster system 10 is depicted. The illustrated animated poster system 10 includes, or may be considered to include a part of, various networked computer systems acting together to control areas of an amusement park, referred to in the figure as a park network 12. The park network 12, in its most general sense, may function to send control signals, images, or streaming media to a plurality of park locations, e.g., various rides and/or attractions. In the context of FIG. 1, the park network 12 may enable communication between other areas of an amusement park, an image server 14, and a projection system 16 having one or more projectors 18 configured to project images onto a simulation panel 20.

The park network 12, by way of example, may include one or more features of a hard-wired local area network (LAN) or personal area network (PAN), a wireless communication network capable of communication via one or more standards (e.g., 802.11 Wi-Fi, Bluetooth, and others). Generally, the park network 12 may also include processing features, such as one or more processors configured to execute instructions stored on one or more machine-readable, non-transitory memory devices. The park network 12 may be considered to interconnect the various electronic devices depicted in FIG. 1, including the image server 14, the projection system 16, and the one or more projectors 18.

The image server 14 may include hardware system components, such as one or more processors 22 configured to execute instructions stored on one or more memory devices 24. The processors 22 may also retrieve data stored on the memory devices 24, such as data provided to the projection system 16 for image reproduction.

In certain embodiments, the image server 14 may be a digital photograph management system and/or video management system (e.g., media management system) enabling a set of animations to be projected by the one or more projectors 18. The image server 14 may also be used for other applications, such as the navigation of very large image sets, the management of various images sizes and regions from a single source, and for streaming media (e.g., video to the projection system 16). As an example, the image server 14 may run one or more streaming videos on a continuous loop.

The one or more processors 22 and memory devices 24 may be configured to process and filter images. For example, such processing may generally include contrast adjustment, color adjustment, and texture effects such as material simulation (e.g., to appear to have a certain texture associated with a particular type of material), to name a few. Other adjustments may include gamma adjustment, saturation adjustment, brightness adjustment, intensity adjustment, and the like. Adjusting these parameters of the images may enable the image server 14 to blend the projected images with the surrounding environment. Specific examples of such image manipulation are described in further detail below.

As illustrated, the projector 18 is projecting media 26 (e.g., via a projection cone) onto the simulation panel 20, which includes various sections that are continuous with one another. The sections include a poster portion 28 and a surrounding wall portion 30 at least partially surrounding the poster portion 28. The poster portion 28 generally corresponds to the section of the simulation panel 20 onto which the projected media 26 is incident. However, it should be noted that the projected media 26 may also be incident onto at least some of the surrounding wall portion 30 to ensure that the entire poster portion 28 is illuminated. The poster portion 28 and the surrounding wall portion 30 may be considered to be continuous with one another in that together they are a single piece (e.g., formed in one piece). Indeed, in one embodiment, at least a forward-facing portion 32 of the simulation panel 20 may be considered to have a continuous surface.

The surrounding wall portion 30 of the simulation panel 20 is made in a way so as to mimic the texture and pattern of a wall 34 to which it is secured. In this way, a transition 36 between the surrounding wall portion 30 and the wall 34 is substantially seamless or is not readily apparent. In the illustrated embodiment, the wall 34 is a brick wall, and the surrounding wall portion 30 is made to look like the brick wall 34. In such embodiments, the surrounding wall portion 30 may be painted and have buttered edges similar to those used in masonry so as to generally have the same pattern and texture as the wall 34. For example, the surrounding wall portion 30 may be machined, cut, or otherwise processed so as to have a shape that generally follows the seams of the brick in the wall 34. In this way, the transition 36 may be considered to occur within the mortar of the wall 34. Indeed, the transition 36 is merely illustrated as a straight line as a general schematic representation. Therefore, casting a mold from the wall 34 to produce the simulation panel 20 may generally enable a more realistic animated poster effect because the poster portion 28 appears to be secured directly to the wall 34.

In addition, because, as described in detail below, the poster portion 28 is produced by casting a mold from the wall 34 onto which a paper the size of the poster portion 28 is secured, the poster portion 28 may include various environmentally consistent features to enhance the animated poster illusion. For example, the poster portion 28 may include wrinkles, tears, may appear to be separated from the wall 34 in some areas, and so forth. Indeed, it is presently recognized that casting the projection surface from a subject surface of the simulation enables enhanced realism. As an example, if the poster portion 28 includes a tear, a portion of underlying brick may be visible.

Returning to the projection of the images onto the poster portion 28, it should be noted that in the illustrated embodiment, the poster portion 28 and, indeed, the entire simulation panel 20, acts as a rear projection screen. In such a configuration, the projector 18 projects images from a first side 38 of the wall 34 and onto the panel 20, and the projected images are presented to guests at a second side 40 of the wall 34, which is opposite the first side 38. Rear projection in this manner may be desirable to block views of the projector 18 from guest areas, which could potentially ruin the illusion. The projected images are reproduced and are visible to guests on the poster portion 28 from the second side 40.

While rear projection may be desirable for certain situations, the present disclosure is not limited to such an arrangement. Indeed, embodiments where the projection surface (the surface onto which images are projected) and the display surface (the surface from which the images are displayed to observers) are the same are also encompassed by the present disclosure. In such embodiments, it should be appreciated that the projector 18 may be hidden from view using environmental features (e.g., a ceiling, lamp post, or another feature into which the projector 18 may be embedded).

In accordance with the present disclosure, the poster portion 28 displays both static and animated elements in the same image and at substantially the same time. However, the animated poster system 10 may also be operated for periods in which only static image elements are displayed, or only animated image elements are displayed. In the illustrated embodiment, the image elements include text elements 42, which may be static elements. The text elements 42, for example, may include a phrase that is recognizable from a popular television show, movies, books, and so on.

To enable such effects, the projection system 16 must project the media in an appropriate manner onto the simulation panel 20. As an example, the projector 18 should be of appropriate resolution, which may be 1080p (1980×1080 progressive scan spatial resolution), 1080i (1980×1080 interlaced scan spatial resolution), 720p (1280×720 progressive scan spatial resolution), or the like. In some embodiments, the projector may have a 4 k resolution (4096×2160). It is anticipated that as projection resolution increases, simulations of the type described herein will generally benefit. The projector 18 and the poster portion 28 may be in a landscape or portrait orientation, depending on the capabilities of the projector 18 and the desired illusion.

In certain embodiments, relatively high resolution (e.g., 1080 p or higher) may be desirable to enable the projected media to include or simulate the texture of the simulated paper. That is, the media (images) may simulate textures. Additionally or alternatively, the media may include a background color for the poster simulation, for example an off-white color, yellowed or aged (e.g., weathered) elements, and so on. Tears in the paper may also be simulated using the media, either in addition to or in lieu of the actual cast portion.

It should be noted that each installation may have a unique set of circumstances that may require different combinations of gamma adjustments, saturation adjustments, and so on. The circumstances that at least partially determine these parameter adjustments may include the lighting conditions of the surroundings, the intended effect of the animated poster (to appear as a new or old, futuristic or antiqued, and so on), and the image elements to be displayed by the simulation panel 20. Further, in some embodiments, the projection system 16 may project images to other portions of the simulation panel 20, such as a top portion 46 or a bottom portion 48 of the wall surrounding portion 30 outside of the poster portion 28. Such projection may, in some embodiments, be performed to ensure that the entire poster portion 28 is illuminated.

While the simulation panel 20 is continuous in that the poster portion 28 and the surrounding wall portion are formed at the same time, the poster portion 28 and the surrounding wall portion 30 may include different materials to achieve their different purposes. For example, referring now to FIG. 2, a front perspective view of the simulation panel 20 is depicted. The view includes a first expanded view 60 of the surrounding wall portion 30 and a second expanded view 62 of the poster portion 28.

Figure 2:
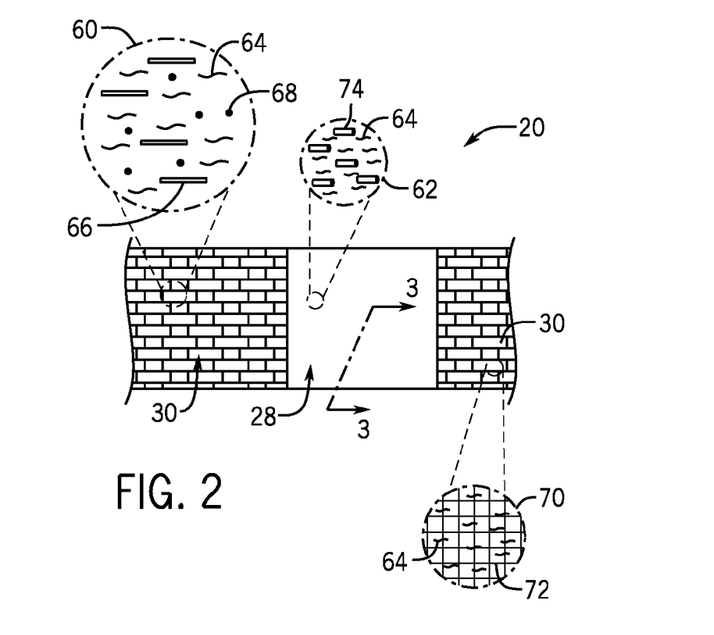
FIG. 2 illustrates a front perspective view of an embodiment of the simulation panel of FIG. 1, and includes expanded views depicting example material constructions for the panel, in accordance with an aspect of the present disclosure.

As depicted, the first expanded view 60 includes a simulated view of certain materials that may be present within the surrounding wall portion 30. The materials include a cast resin 64 of the simulation panel 20, which may constitute a substantial portion of the materials forming the overall panel 20. The cast resin 64 may include, as an example, any resin that is suitable for resin casting processes and that will cure to a substantially clear or translucent cast. Non-limiting examples of the cast resin 64 include acrylic resins (e.g., polyacrylates), epoxy resins, polycarbonate resins, styrenic resins (e.g., general purpose polystyrene), unsaturated polyester resins, polyurethane resins, silicone resins, and the like.

The simulated wall portion 30 may further include, as shown in the first expanded view 60, one or more filler materials used for structural reinforcement. Such filler materials may include any one or a combination of fibers 66, particles 68, and similar filler materials. Other possible materials may include nanostructures such as nanoparticles, nanotubes, nanofibers, or similar materials. In some embodiments, as shown in a third expanded view 70, a larger structure such as a glass mat 72 may be used for structural reinforcement of the surrounding wall portion 30. Therefore, the surrounding wall portion 30 may be formed from or include a composite material that has sufficient strength to act as a structural part of the wall 34 (FIG. 1). The surrounding wall portion 30 may also be painted, for example with an acrylic paint, to match the other remaining portion of the wall 34 (FIG. 1).

In one embodiment, as shown in the second expanded view 62, a filler material 74 such as certain types of nanostructures, fibers of selected material composition, or the like, may be utilized that does not substantially interact with light used for the animated poster. The filler material 74 may therefore be incorporated into the entire simulation panel 20, which can reduce the number of steps required for its construction. On the other hand, the poster portion 28 may include fewer structural reinforcement components compared to the surrounding wall portion 30 to enhance its ability to display the images projected onto it by the projection system 16.

Figure 3:
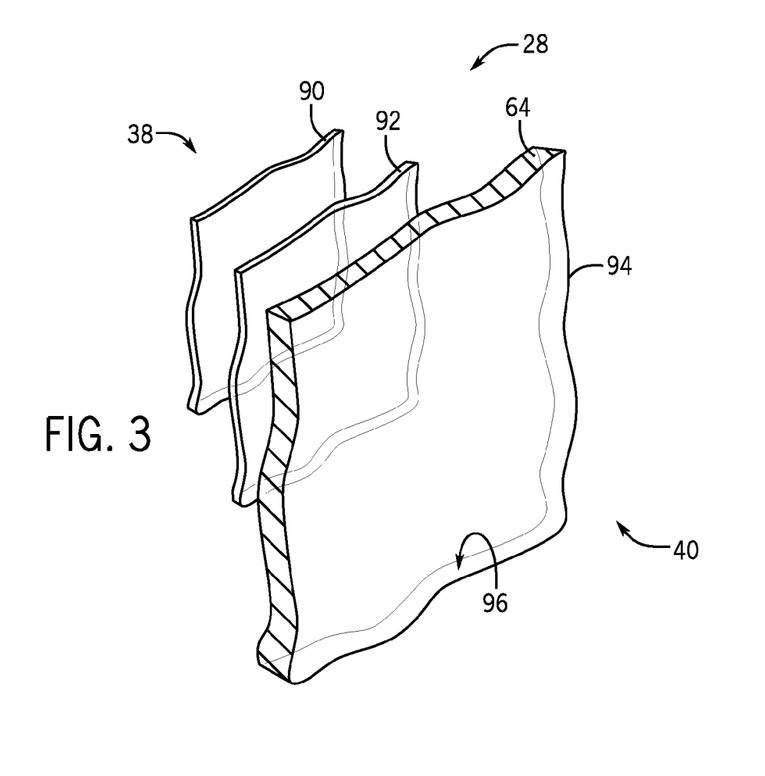
FIG. 3 illustrates a perspective view of different layers that can be incorporated into a poster portion of the simulation panel of FIGS. 1 and 2, in accordance with an aspect of the present disclosure.

The various components of the poster portion 28 of the simulation panel 20 may be further appreciated with respect to FIG. 3, which is an exploded side view of various optical and structural elements of the poster portion 28. As depicted, moving from the first side 38 of the panel 20 to the second side 40 of the panel 20, a first layer 90 may include, by way of example, a physical optical density filter. More specifically, the physical optical density filter may be a neutral density filter. The neutral density filter may be either a colorless filter or a gray filter configured to reduce and/or modify the intensity or emission of all wavelengths or colors of light from the projector 16 equally, while maintaining a substantially equivalent hue of color rendering. More generally, the first layer 90, a neutral density filter, may provide appropriate lighting level to the projected image to substantially match ambient lighting while maintaining image quality. Further, while only one physical optical density filter is shown, it should be noted that there may be one, two, three, or more filters, depending upon the desired luminance, color levels, and so forth, for the animated poster. For example, other density filters may include amber density filters, which may be configured to simulate aging of the poster by magnifying or reducing yellow hues.

The appropriate lighting level of the projected image may be generated by the first layer 90 for incidence onto a second layer 92, which is a translucent sheet of paper. It should be noted that where the term "paper" is used in the present disclosure, that this term is intended to encompass traditional wood-based paper materials, synthetic paper materials, writing mediums made from animal skin or synthesized to mimic such natural materials (e.g., real or synthetic vellum), bond paper, rice, paper, canvas, and other textiles or suitable writing mediums. Indeed, the material forming the sheet may, in certain embodiments, be primary selected based on its texture and optical qualities (e.g., optical transmittance). That is, the optical qualities of the translucent sheet may be such that the effects described herein may be achieved.

The translucent sheet of paper is configured to provide image density, as well as a physical paper texture that is used in combination with or in lieu of simulated texture using the projected media. The paper is translucent in that it enables some, but not all, of the projected image from the projector 18 to pass therethrough. This partial transmittance may be partial in terms of optical flux (e.g., resulting in a reduction in intensity of substantially all visible wavelengths), in terms of wavelength (e.g., resulting in certain wavelengths being fully transmitted while others being absorbed), or both (e.g., certain wavelengths are absorbed more than others, but most visible wavelengths are reduced in intensity by at least some amount).

The image density is established by providing a surface onto which a certain amount of pixels is incident, the number of pixels being determined by the projector 18 (FIG. 1). In one embodiment, the second layer 92 may be sized so as to have substantially the same image density as a real poster without animations.

The second layer 92, and in some embodiments, the first layer 90, may be embedded into or set into a third layer 94, which is a layer formed from the casting resin 64. The third layer 94 may also include structural reinforcement, when provided in the poster portion 28. However, it should be noted that the third layer 94 is generally clear in that it enables substantially all wavelengths of visible light to pass therethrough (e.g., at least 90%, at least 95%, or at least 99% to pass). Therefore, any structural reinforcement would also be substantially clear. The relationship between the second layer 92 and the third layer 94 may be one in which the second layer 92 (i.e., the translucent sheet) has a first optical transmittance for the projected media, the third layer 94 has a second optical transmittance for the projected media, and the second optical transmittance is greater than the first.

In one embodiment, the third layer 94 may include an inset 96 corresponding to a piece of paper (or any other writing medium or textile) placed on the wall 34 during production of the panel 20. In this way, the third layer 94 may include various geometrical elements representative of imperfections in the original piece of paper, such as tears, wrinkles, and so forth. Accordingly, in such embodiments, the images that illuminate the panel 20 would display a portion of underlying brick if the tears were sufficiently large.

While the inset 96 may generally be of any size, the inset 96 will, in some embodiments, correspond to the size of the animated poster. Accordingly, the translucent paper (the second layer 92) may also have this size. Indeed, the poster portion 28 of the simulation panel 20 is entirely dedicated to the animated poster and, therefore, the third layer 94 may generally correspond in size to the second layer 92.

Figure 4:
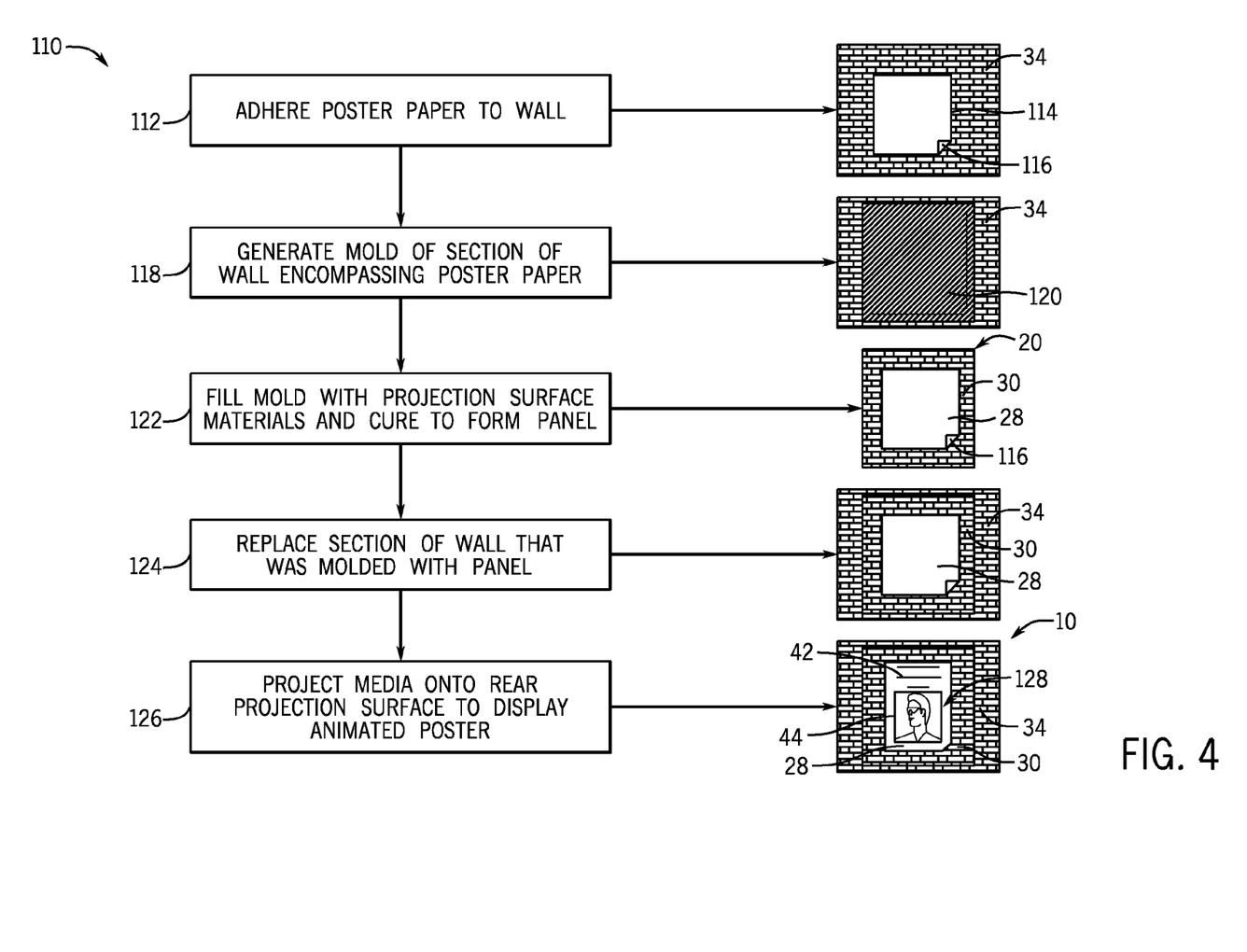
FIG. 4 is a process flow diagram illustrating an embodiment of a method of producing an animated poster and also illustrating example front perspective views of different stages of constructing the wall having the simulation panel of FIGS. 1-3 as the method is performed, in accordance with an aspect of the present disclosure.

FIG. 4 is a process flow diagram depicting an embodiment of a method 110 for producing an animated poster. FIG. 4 also includes example front perspective views of the wall 34 and the formation of the simulation panel 20 corresponding to certain of the disclosed steps of the method 110 to facilitate explanation. In the illustrated embodiment, the method 110 includes adhering (block 112) or otherwise securing a poster (e.g., paper) 114 to the wall 34. For example, the poster 114 may be adhered to the wall 34 using adhesive, or another feature such as a tack, nail, or the like. Indeed, in certain embodiments, a nail may be simulated when the animated poster is completed.

The poster 114 need not have any images. However, it will generally be the exact size, or at least approximate the size of the poster that will be the subject of the simulation. In addition, the poster paper 114 may have imperfections 116 such as creases, may be torn, or may include bends or similar features. A portion of the underlying brick of the wall 34 would therefore be visible. Indeed, the texture of the underlying brick would be reproduced in a mold, as described below.

The method 110 also includes generating (block 118) a mold 120 of a section of the wall 34 corresponding to the poster paper 114 and, in certain embodiments, a surrounding section of the wall 30. Indeed, only the poster may be reproduced in certain implementations. However, reproducing a portion of the wall 34 in addition to the poster 114 may enhance the realism of the simulation panel 20.

Generally, any mold material may be used to produce the mold 120 of the present embodiments. However, due to the nature of the process steps in the production of the panel 20, and due to the difficulty associated with generating the mold 120 in a suspended state (e.g., stuck to the wall 34), it may be desirable to use a polymeric material for the mold 120. In this way, the formation of the simulation panel 20 may be considered to include a resin casting process. In this regard, it may be desirable to use a mold material such as a fluoropolymer-based mold material, a silicone polymer (e.g., polyalkylsiloxane) mold material, or a similar mold material. Indeed, such mold materials may enable a cast resin formed within the mold 120 to be easily removed due to the relatively low adhesion to many surfaces for these materials.

The formation of the mold 120 may be performed by applying a molten polymer or monomer syrup (e.g., a viscous mixture of the monomer and a solvent) over a section of the wall 34 and poster 114, and curing the syrup or allowing the molten polymer to harden. Additionally or alternatively, the mold 120 may be formed by dissolving a polymer to form a polymer solution, applying the polymer solution onto the section of the wall 34, and allowing the solvent to evaporate and leave behind the hardened polymer.

Upon formation of the mold 120 in accordance with acts represented by block 118, the mold 120 may be removed from the wall 34 and filled (block 122) with a casting material, such as the material used to form the cast resin 64 described above with respect to FIG. 2. Indeed, any one or a combination of the materials described above with respect to FIG. 2 may be incorporated into the acts of block 122 in filling the mold 120. Such materials may include, by way of example, a structural reinforcement material in the portion of the mold 120 corresponding to the surrounding wall portion 30, and the translucent sheet and neutral density filter in the portion of the mold 120 corresponding to the poster portion 28. However, in other embodiments, the density filter and the translucent sheet may be added after curing.

After the casting material and all other desired materials are disposed in the mold 120, the casting material may then be cured. For example, the curing may include an application of heat to begin a polymerization process or to facilitate crosslinking in an existing, flowable polymer. Additionally or alternatively, a polymerization initiator and/or polymerization catalyst may be added to the casting material to facilitate polymerization and/or crosslinking.

After the resin is cured, the panel 20 is formed (e.g., after application of the translucent sheet and density filter within the paper imprint of the casting) and is removed from the mold 120. As shown to the side of block 122, the poster portion 28 includes the same imperfection 116 as the initial paper poster 114 due to the molding process. It should be appreciated that this effect is also apparent in the surrounding wall portion 30, which includes the same texture and pattern as the section of the brick wall 34 over which the mold 120 was formed in accordance with block 118.

Upon production of the panel 20, the panel 20 may be used to replace (block 124) at least a portion of the section of the wall 34 that was subject to the initial molding process in accordance with block 118. The acts represented by block 124 may include removing the section of the wall 34 by cutting or any other suitable method. It should be noted that the cutting way of the portion of the wall 34 may follow, for example, mortar lines instead of cuts through the bricks of a brick wall. However, cutting through the bricks may also be performed.

Once an opening in the wall 34 is formed by this removal, the panel 20, which is sized substantially the same as the section just removed (e.g., after additional cutting of the cast to match the geometry of the cut away section), may be placed in the opening and secured to the remainder of the wall 34. As an example, the panel 20 may be secured to the wall using masonry techniques, such as buttering the edges of the panel 20 during installation. To enable the panel 20 to be secured to the wall 34 at its existing masonry lines.

To further blend the panel 20 in with the remaining wall 34, the panel 20, specifically the surrounding wall portion 30 of the panel 20, is painted. The paint may be acrylic paint, or any other suitable paint that substantially matches the color of the wall 34 (e.g., the brick of the wall). The grout or cement used to couple the bricks together in the wall 34 may also be simulated by painting the apparent joints between the molded brick portions of the surrounding wall portion 30. Furthermore, if brick textures and geometries are reproduced within the poster portion 28 (e.g., if the poster is to simulate a tear), those sections may also be painted using the same color paint.

After completion and installation of the panel 20, the method 110 may include projecting (block 126) media onto the panel 20, specifically the poster portion 28, to generate an animated poster 128 having the static and animated elements 42, 44. While the illustrated embodiment notes that this projection is a rear projection method, as discussed above with respect to FIG. 1, the projection surface and the display surface may also be the same.

Indeed, as discussed above, the present embodiments enable a moving image to appear on a textured surface with no detectable projection devices. Therefore, what appears to be paper that is wrinkled, torn, and/or pasted to the wall, includes graphics that also appear to be printed but include moving images. Indeed, it has been found that the approaches described herein can produce a convincing illusion of an animated poster, even at close observing distances.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. An animated poster system, comprising:
 a simulation panel comprising a poster portion, wherein the poster portion comprises a cast resin in which a sheet configured to act as an illumination surface is positioned;
 a projector configured to project an image onto a first side of the simulation panel so as to illuminate the sheet such that the image is reproduced on the sheet; and
 an image server in communication with the projector and comprising a non-transitory, machine-readable medium storing data representative of the image, and the data is such that the image reproduced on the sheet contains animated image elements, thereby creating an appearance of an animated poster on the poster portion; and
 wherein the sheet is translucent with respect to light corresponding to the projected image.

2. The animated poster system of claim 1, wherein the simulation panel is secured to and forms at least a part of a wall, the simulation panel comprises a surrounding wall portion at least partially surrounding the poster portion and having a textured pattern that is substantially the same as a textured pattern of the wall.

3. The animated poster system of claim 1, wherein the simulation panel is configured to secure to and form at least a part of a wall, the simulation panel comprises a surrounding wall portion at least partially surrounding the poster portion and having a textured pattern that is substantially the same as a textured pattern of the wall, and wherein the surrounding wall portion comprises the casting resin and a filler disposed within the casting resin configured to provide structural reinforcement to the simulation panel.

4. The animated poster system of claim 1, wherein the simulation panel is configured to secure to and form at least a part of a wall, the simulation panel comprises a surrounding wall portion at least partially surrounding the poster portion and having a textured pattern that is substantially the same as a textured pattern of the wall, and wherein the simulation panel is a continuous piece having the surrounding wall portion and the poster portion.

5. The animated poster system of claim 1, wherein at least the poster portion comprises a neutral density filter configured to physically filter light that is incident on the sheet from the projector.

6. The animated poster system of claim 5, wherein the simulation panel is a rear projection panel that enables the projector to project the image through the cast resin, through the neutral density filter, and onto the sheet.

7. The animated poster system of claim 1, wherein the cast resin is substantially transparent with respect to visible light.

8. The animated poster system of claim 1, wherein the data is such that the image reproduced on the sheet simulates a texture of paper.

9. The animated poster system of claim 1, wherein the image server, the projector, or both, are configured to adjust a brightness of the image reproduced on the sheet to balance with ambient lighting in a setting including the simulation panel such that the image reproduced on the sheet has the appearance of a flat, graphic surface.

10. The animated poster system of claim 1, wherein the simulation panel is formed by a process comprising:
 securing a poster to a wall;
 creating a mold of at least the poster using a mold material such that the mold comprises a texture and geometry of the poster;
 filling the mold with a casting material;
 curing the casting material to form a cast resin having the texture and geometry of the poster; and
 placing the sheet within a position corresponding to the geometry of the poster.

11. The animated poster system of claim 10, wherein creating a mold of at least the poster using the mold material comprises applying the mold material to the wall beyond a perimeter of the poster such that the mold material is also applied directly to the wall, and such that the mold also comprises a geometry and texture of a portion of the wall.

12. A method, comprising:
 forming a simulation panel by a process comprising:
  creating a mold of at least a poster on a textured wall using a mold material such that the mold comprises a texture and geometry of the poster;
  filling the mold with a casting material;
  curing the casting material to form a cast resin, wherein the cast resin comprises the texture and geometry of the poster; and
  placing a translucent sheet in a position corresponding to the geometry of the poster, wherein the translucent sheet is placed in the position corresponding to the geometry of the poster after the curing of the casting material, or before the curing of the casting material.

13. The method of claim 12, wherein the process comprises placing a neutral density filter in the position corresponding to the geometry of the poster in an overlapping relationship with the translucent sheet.

14. The method of claim 12, wherein creating a mold of at least the poster using the mold material comprises applying the mold material to the wall beyond a perimeter of the poster such that the mold material is also applied directly to the wall, and such that the mold also comprises a geometry and texture of a portion of the wall.

15. The method of claim 14, comprising removing at least some of the portion of the wall that was molded to form an opening in the wall, and securing the simulation panel to the wall such that the opening is at least partially filled with the simulation panel.

16. The method of claim 15, wherein securing the simulation panel to the wall such that the opening is at least partially filled with the simulation panel comprises trimming a perimeter of the simulation panel to match a brick pattern of a remaining portion of the wall at the opening.

17. The method of claim 15, comprising:
positioning a projector on one side of the wall, the projector being in communication with an image server comprising one or more non-transitory, machine readable media storing data corresponding to one or more images; and
projecting the one or more images onto a projection surface of the simulation panel at least in a region corresponding to a position of the translucent sheet so as to reproduce the one or more images on the simulation panel, wherein the data corresponding to the one or more images is such that when the one or more images is reproduced on the simulation panel, the one or more images comprise static elements and animated elements to thereby create the appearance of an animated poster.

18. The method of claim 17, wherein positioning the projector on the one side of the wall comprises hiding the projector from vantage points on an opposite side of the wall from where the one or more images are viewed on the simulation panel.

19. A system, comprising:
a simulation panel formed by a process comprising:
securing a poster to a wall;
creating a mold of the poster and at least a portion of the wall beyond a perimeter of the poster using a mold material such that the mold comprises a texture and geometry of the poster and a texture and geometry of the portion of the wall;
filling the mold with a casting material;
polymerizing the casting material to form a cast resin, the cast resin having at least some of the texture and the geometry of the poster and the wall, and wherein the casting material is such that the cast resin has a first optical transmittance; and
placing a translucent sheet in a position corresponding to the geometry of the poster such that the translucent sheet is disposed within an inset of the casting resin, and wherein the translucent sheet has a second optical transmittance that is lower than the first optical transmittance.

20. The system of claim 19, wherein the process comprises placing an optical filter in a position corresponding to the geometry of the poster such that the optical filter has an overlapping positional relationship with respect to the translucent sheet.

21. An animated poster system, comprising:
a simulation panel comprising a poster portion, wherein the poster portion comprises a cast resin in which a sheet configured to act as an illumination surface is positioned;
a projector configured to project an image onto a first side of the simulation panel so as to illuminate the sheet such that the image is reproduced on the sheet; and
an image server in communication with the projector and comprising a non-transitory, machine-readable medium storing data representative of the image, and the data is such that the image reproduced on the sheet contains animated image elements, thereby creating an appearance of an animated poster on the poster portion; and
wherein the simulation panel is secured to and forms at least a part of a wall, the simulation panel comprises a surrounding wall portion at least partially surrounding the poster portion and having a textured pattern that is substantially the same as a textured pattern of the wall.

22. An animated poster system, comprising:
a simulation panel comprising a poster portion, wherein the poster portion comprises a cast resin in which a sheet configured to act as an illumination surface is positioned;
a projector configured to project an image onto a first side of the simulation panel so as to illuminate the sheet such that the image is reproduced on the sheet; and
an image server in communication with the projector and comprising a non-transitory, machine-readable medium storing data representative of the image, and the data is such that the image reproduced on the sheet contains animated image elements, thereby creating an appearance of an animated poster on the poster portion; and
wherein the cast resin is substantially transparent with respect to visible light.

23. An animated poster system, comprising:
a simulation panel comprising a poster portion, wherein the poster portion comprises a cast resin in which a sheet configured to act as an illumination surface is positioned;
a projector configured to project an image onto a first side of the simulation panel so as to illuminate the sheet such that the image is reproduced on the sheet; and
an image server in communication with the projector and comprising a non-transitory, machine-readable medium storing data representative of the image, and the data is such that the image reproduced on the sheet contains animated image elements, thereby creating an appearance of an animated poster on the poster portion; and
wherein the data is such that the image reproduced on the sheet simulates a texture of paper.

\* \* \* \* \*